Oct. 20, 1964  P. L. E. KUNTZMANN  3,153,348
TRANSMISSION CHAIN
Filed April 11, 1962

3,153,348
TRANSMISSION CHAIN
Paul Louis Emile Kuntzmann, Villejuif, France, assignor to Compagnie des Transmissions Mecaniques Seine-Doubs-Isere, Levallois-Perret (Seine), France, a corporation of France
Filed Apr. 11, 1962, Ser. No. 187,155
Claims priority, application France, Apr. 13, 1961, 858,630, Patent 1,294,264
12 Claims. (Cl. 74—255)

The present invention relates to transmission chains which engage with sprockets or toothed wheels.

In all known chains, whether they are of the type having rollers or of the "silent" type, the articulations of the links consist in the rotation of a usually solid pin within the bore of at least one hollow element or "false" roller, these elements being rigidly connected to plane spacer members constituting the side members of the roller chains or the plates of the silent chains.

In order to permit the rotation of the pin within the false roller, clearance is provided in the mounting of these two elements; further, the journalling of the pin in the false roller corresponds to a sliding of one of the elements on the other and this gives rise to wear phenomena. Now, the effective pitch of a chain is defined by the distance between the pins of two consecutive articulations when their constituent elements are in close contact with one another. Thus, when a chain is worn, its effective pitch is increased.

In other words, a transmission chain can be considered as a series of smooth bearings disposed one after the other at regular intervals. But the two elements constituting the smooth bearing (pin and false roller) do not effect a continuous movement of rotation but rather an oscillatory movement relative to each other. The value of the angle of this oscillation depends on the number of teeth of the chain wheel or sprocket engaged with the chain and never exceeds 30°. With respect to the pressure of contact, which are sometimes termed "specific unit pressure," these reach, under normal condition of operation, considerable values owing to the fact of the differences in diameter of the elements in sliding contact (pins and false rollers). The inevitable asperities or roughness of their surface come into contact with one another and thereby create microwelds which burn the greasy and oily film formed by the lubrication product. Consequently, there occurs a rupture in the greasy film of lubricant and the surfaces in contact seize; wear results from the wrenching of the particles of metal away from the surfaces in contact. There is in fact a superficial intergranular decohesion and creep.

From the foregoing it might be said that the conditions of operation of the succession of smooth bearings (pins and false rollers) constituting a transmission chain preclude the maintenance of a film of lubrication of sufficient strength, so that in practice it is impossible to avoid in the articulations of the chain that there is at some time a limit condition of lubrication or that conditions exceed this limit and give rise to dry friction.

Further, in numerous chain applications lubrication is practically impossible either because the mounting of these chains render them inaccessible for maintenance purposes or because technical reasons preclude greasing; this is the case for example of utilization of the chain in which the lubricant would pollute or dirty the products worked (textile or food industry); in other cases, the chains are subjected to the action of water or moisture which accelerates the corrosion and wear of the articulations (in particular agricultural machines).

The object of the invention is to provide an articulation device for a transmission chain having at least two elements constituted respectively by an outer element, namely the false roller, and an inner convex element constituting a pin disposed with clearance in said outer element with which it is in contact and relative to which it is movable, said device reducing the wear phenomena considerably. Said device is such that the outer element, namely the false roller, is provided internally with an electrolytic layer of at least one relatively soft and tender metal having such radial thickness that there is between the pin and the layer uniformly distributed in the bore of the outer element a clearance roughly equal to said thickness of the layer.

Indeed, owing to its plasticity the soft and tender electrolytic material of the layer is deformed under the effect of the pressure and fits round substantially in accordance with a semi-circumference the real surface of the inner element constituting the articulation pin and thereby reduces the specific unit pressure.

Further:

(a) The resistance to pressure of the layer material employed enables it to resist without difficulty the pressures of contact occurring normally in the articulation.

(b) The layer material opposes contact between the rubbing surfaces and therefore prevents the component metals of the articulation from seizing; this material performs in what may be termed an ideal manner the functions of a lubricating film; namely to separate the rubbing surfaces so as to prevent their mutual wear.

(c) The much lower value of the coefficient of friction of the contact between the soft metal and the steel of the pin relative to that of the contact between the steel of the false roller and the steel of the pin corresponds to conditions of friction and wear which would be otherwise unobtainable.

(d) Owing to the fact that due to its soft electrolytic layer the outer element forming the bore adapts itself without tolerance to the real dimension of the convex element constituting the pin, the clearance between the two elements is reduced to a minimum and opposes introduction of particles which could accelerate the wear phenomena; if by chance such a particle managed to enter the articulation according to the invention, it becomes embedded in the soft metal of the layer of the outer element and consequently does not create concentrations of stresses resulting from reduction of the bearing surfaces to definite points of contact, which would accelerate the wear phenomena.

According to another feature of the invention, another soft electrolytic layer or coating is provided on the outer face of the outer element which permits, for the reasons given hereinbefore, reducing the wear of the free elements termed rollers through the medium of which the chain engages the chain wheels or sprockets.

It should be observed that with the two coatings or layers, when using the chain in inflammable atmospheres the soft non-ferrous layers preclude sparks and there is no danger of fire or explosion.

The metal or metals deposited electrolytically is or are selected from the following: cadmium or nickel or among the alloys which are capable of being deposited electrolytically such as a lead-base, copper-base or zinc-base alloy.

Another object of the invention is to provide a transmission chain whose articulation devices having pins and false rollers or the like are of the improved type defined hereinbefore, which permits operating this chain without lubrication and practically without maintenance.

Further features and advantages of the invention will be apparent from the ensuing description, with reference to the accompanying drawing to which the invention is in no way limited.

In the drawing:

FIG. 1 is a partial longitudinal sectional and plan view of a roller chain provided with articulation device according to the invention, this chain being shown in its condition after manufacture before having been put under tension in service and before running in;

FIG. 3 is a sectional view similar to FIG. 2 on an enlarged scale of an articulation of this roller chain after the latter has been put under tension and run in.

Figure 3:
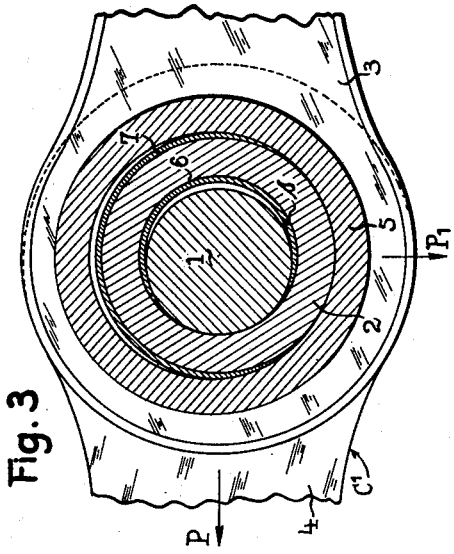
Figure 1:
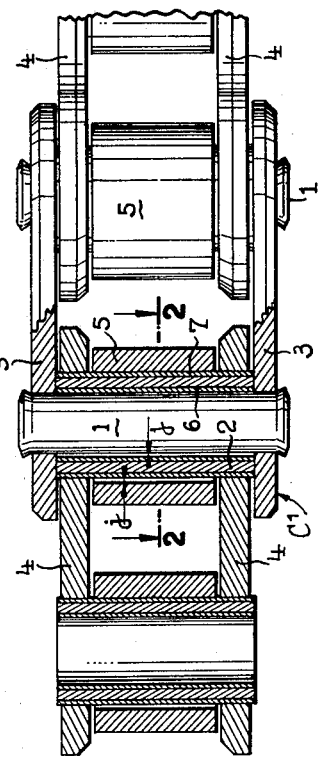
Figure 2:
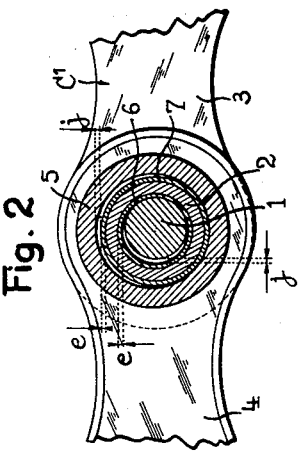
FIG. 2 is a partial section view taken along line 2—2 of FIG. 1.

FIGS. 1–3 show the invention applied to a roller chain $C^1$ in which the articulations interconnecting the various links of the chain each comprise a pin 1 and a false roller or bushing 2. The pins 1 interconnect in the usual manner the outer side members 3 whereas the false rollers 2 interconnect the inner side members 4. Freely mounted on the false rollers 2 are rollers 5. These elements are composed of steel.

Each false roller 2 comprises the soft electrolytic inner and other coatings or layers 6 and 7 according to the invention. These electrolytic layers have, when they are uniformly distributed round the element 2, a radial thickness $e$ (FIG. 2) and this thickness is such that, when taking into account the diameters of the metal elements, it is roughly equal to the clearances $j$ which exist between the coated false roller 2 and the pin 1, on the one hand, and the roller 5 on the other.

In FIGS. 1 and 2, the chain is not under service tension and has not yet been run in.

FIG. 3 shows the same component element of the chain as FIG. 1 but enlarged, after the chain has been run in. The pin 1 has taken up its working position under the action of the tension force P in the layer 6 of the false roller 2 and this layer exactly fits round the shape of the pin over a semi-circumference. The same is true in respect of the outer layer 7 which under the effect of the force $P_1$ fits round a part of the circumference of the roller 5.

FIG. 3 shows that a grain of sand $s$ has managed to become embedded without harm in the surface layer 6.

Figure 4:
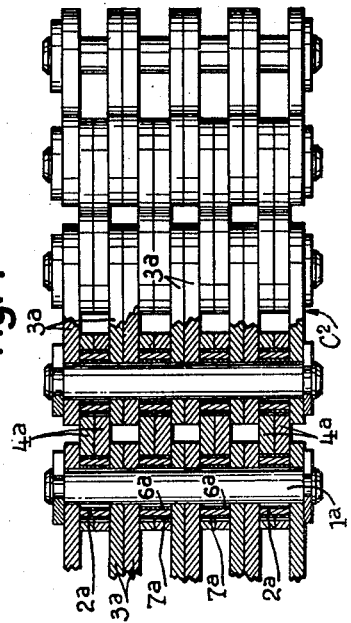
FIG. 4 is a view similar to FIG. 1 in the case of a silent chain.

With reference now to FIG. 4 which shows the application of the invention to a chain of the "silent" type $C^2$, the latter comprises pins $1^a$ interconnecting outer plates $3^a$ whereas the intermediate plates $4^a$ are articulated to these pins $1^a$ by short false rollers or bushings $2^a$ whose length is limited, in the presently-described embodiment, to the thickness of two plates $4^a$, the latter being adjacent and connected in pairs. As will be understood, in this chain $C^2$ it is the false rollers $2^a$ which are treated in accordance with the invention; each of them comprises an inner electrolytic layer $6^a$ and an outer electrolytic layer $7^a$.

The various features and advantages of the articulation device for chains according to the invention will be better understood with reference to the following examples, to which the scope of the invention is in no way limited.

*Example 1*

The members or elements constituting the articulation devices of the chain, such as the pins 1 or $1^a$ and the false rollers 2 or $2^a$, are so machined as to be solids of revolution having rectilinear generatrices when they are mounted on the chain, their being machined from a carburizing steel having the following percentage composition by weight in addition to the iron:

| | |
|---|---|
| Carbon | 0.08 to 0.15 |
| Silicon | 0.15 to 0.35 |
| Manganese | 0.30 to 0.50 |
| Sulphur and phosphorus | ≤0.035 |

These elements are thereafter case-hardened in a rotary retort with a carburizing compound formed of about 60% of activated carbon and 40% of barium carbonate (process known as carburizing). The elements are maintained in the presence of the carburizing mixture in the rotary retort at a temperature of 920°–940° C. during a variable period of time of 20–30 minutes so as to obtain a surface layer which is rich in carbon and whose thickness is between 0.40 and 0.50 mm. The elements are then quenched in water and thereafter subjected to relieving treatment at 180° C. during 20 minutes.

The pins 1 or $1^a$ are then employed as such for mounting the chain whereas the false rollers machined so as to give, metal against the metal, a clearance of about 0.03 mm., are subjected before mounting to an electrolytic treatment. In a preferred method, the false rollers are treated electrolytically at room temperature in drums in an aqueous cadmium plating bath having for example the following composition:

| | G./litre |
|---|---|
| Cadmium cyanide | 40 |
| Sodium cyanide | 70 |
| Caustic soda | 30 |
| Casein | 0.5 |
| Water, enough to make up 1 litre. | |

The elements are maintained in the bath under a difference of potential of about 12 volts with a current density of 1.2 amps/sq. dm. for 30 minutes. In this way there is obtained a surface layer of cadmium whose thickness is between 0.007 and 0.01 mm. so that the clearance $j$ is brought to about 0.01 mm., that is, it is equal to about the thickness of each of the layers obtained.

The elements are rinsed, washed and dried. They are then mounted on the chain.

*Example 2*

The false rollers are treated in drums in a nickel plating bath having the following composition:

| | G./litre |
|---|---|
| Simple nickel sulplate | 200 |
| Sodium chloride | 20 |
| Sodium sulphate | 20 |
| Boric acid | 5 |
| Arabic gum | 0.3 |
| Water, enough to make up 1 litre. | |

The characteristics of the electric current are as follows:

| | |
|---|---|
| Voltage volts | 12 |
| Current density amps/sq. dm. | 8 |

*Example 3*

The elements are treated in a brass plating bath so as to deposit an alloy having the following composition:

| | Percent by weight |
|---|---|
| Copper | 65 |
| Zinc | 35 |

The composition of the bath is as follows:

| | G./litre |
|---|---|
| Copper cyanide | 35 |
| Zinc cyanide | 11.5 |
| Sodium cyanide | 68 |
| Anhydrous sodium carbonate | 37 |

The characteristics of the current are as follows:

| | |
|---|---|
| Voltage volts | 12 |
| Current density amps/sq. dm. | 6 |

Although specific embodiments of the invention have been described, many modifications and changes may be made therein without departing from the scope of the invention as defined in the appended claims.

Having now described my invention what I claim as new and desire to secure by Letters Patent is:

1. In an unused new transmission chain intended to transmit a given load, the combination comprising first chain link elements each having a transversely extending bore constituting a cylindrical inner face, a deposit of soft and compressible metallic bearing material on said inner face constituting thereover a cylindrical lining adhering to said face, second chain link elements each including a transversely extending cylindrical member pivotally mounted in said cylindrical lining of the adjacent first link element, and means for retaining the cylindrical members in said linings, the pitch between said first elements and second elements being less than the intended nominal pitch of the link elements to a given extent and said bearing material being compressible during chain operation under said load to an extent identical to said given extent, whereby in chain operation the cylindrical members are embedded in said linings.

2. In a new unused transmission chain intended to transmit a given load and having outer link members and inner link members, an articulation device for pivotally connecting the outer link members to the inner link members which comprises in combination: a metal bushing having a hard surface and associated with the inner link members and having a cylindrical inner face defining a bore, an electrolytic deposit of soft metallic material on said inner face and providing thereover a cylindrical soft bearing surface, and a cylindrical metal member having a hard surface and associated with the outer link members and pivotally mounted in said bore with interposition of said deposit, the thickness of the deposit being substantially equal to the clearance between the cylindrical member and the bearing surface, the pitch between said outer link members and said inner link members being less than the intended nominal pitch of the link members to a given extent and said metallic material being compressible during chain operation under said load to an extent identical to said given extent, whereby when the chain operates, said cylindrical member is embedded in said metallic material and the link members have said nominal pitch.

3. In an unused new transmission chain intended to transmit a given load and having outer link members and inner link members, an articulation device for pivotally connecting the outer link members to the inner link members which comprises in combination: a case-hardened steel bushing associated with the inner link members and having a cylindrical inner face defining a bore, a thin plating of metallic material softer than the case-hardened steel of the bushing on said inner face constituting thereover a soft bearing surface, and a cylindrical case-hardened steel member associated with the outer link members and pivotally mounted in said bore with interposition of said layers, the pitch between said outer link members and said inner link members being less than the intended nominal pitch of the link members to a given extent and said metallic material being compressible during chain operation under said load to an extent identical to said given extent, whereby when the chain operates, said cylindrical member is embedded in said metallic material and the link members have said nominal pitch.

4. In a new unused transmission chain intended to transmit a given load and having outer link members and inner link members, an articulation device for pivotally connecting the outer link members to the inner link members which comprises in combination: a steel bushing engaged in the inner link members and having a cylindrical inner face defining a bore, an electrolytic coating of cadmium on said inner face constituting thereover a cylindrical bearing surface, and a steel cylindrical member engaged in said outer link members and pivotally mounted in said cadmium coated bore, the thickness of the coating being substantially equal to the clearance between the cylindrical member and the bearing surface before the chain has been run in, the pitch between said outer link members and said inner link members being less than the intended nominal pitch of the link members to a given extent and said cadmium being compressible during chain operation under said load to an extent identical to said given extent, whereby when the chain operates, said cylindrical member is embedded in said cadmium and the link members have said nominal pitch.

5. In a new unused transmission chain intended to transmit a given load and having outer link members and inner link members, an articulation device for pivotally connecting the outer link members to the inner link members which comprises in combination: a steel bushing engaged in the inner link members and having a cylindrical inner face defining a bore, an electrolytic coating of nickel on said inner face constituting thereover a cylindrical bearing surface, and a steel cylindrical member engaged in said outer link members and pivotally mounted in said nickel coated bore, the thickness of the coating being substantially equal to the clearance between the cylindrical member and the bearing surface, the pitch between said outer link members and said inner link members being less than the intended nominal pitch of the link members to a given extent and said nickel being compressible during chain operation under said load to an extent identical to said given extent, whereby when the chain operates, said cylindrical member is embedded in said nickel and the link members have said nominal pitch.

6. In an unused new transmission chain intended to transmit a given load and having outer link members and inner link members, an articulation device for pivotally connecting the outer link members to the inner link members which comprises in combination: a steel bushing engaged in the inner link members and having a cylindrical inner face defining a bore, an electrodeposit of a soft bearing metal alloy on said inner face and constituting thereover a cylindrical bearing surface, and a steel cylindrical member engaged in said outer link members and pivotally mounted in said bore with interposition of said layer, the thickness of the layer being substantially equal to the clearance between the cylindrical member and the bearing surface, the pitch between said outer link members and said inner link members being less than the intended nominal pitch of the link members to a given extent and said metal alloy being compressible during chain operation under said load to an extent identical to said given extent, whereby when the chain operates, said cylindrical member is embedded in said metal alloy and the link members have said nominal pitch.

7. In an unused new transmission chain intended to transmit a given load and having outer link members and inner link members, an articulation device for pivotally connecting the outer link members to the inner link members which comprises in combination a steel bushing engaged in the inner link members and having a cylindrical inner face defining a bore, an electrodeposit of an alloy of copper and zinc on said inner face constituting thereover a cylindrical bearing surface and a steel member engaged in said outer link members and pivotally mounted in said bore with interposition of said layer, the thickness of the layer being substantially equal to the clearance between the cylindrical member and the bearing surface, the pitch between said outer link members and said inner link members being less than the intended nominal pitch of the link members to a given extent and said alloy being compressible during chain operation under said load to an extent identical to said given extent, whereby when the chain operates, said cylindrical member is embedded in said alloy and the link members have said nominal pitch.

8. In a transmission chain having outer link members and inner link members, an articulation device for pivotally connecting the outer link members to the inner link members which comprise in combination: a metal bushing having a hard surface and rigidly engaged with the inner link members and having a cylindrical inner face defining a bore, a first electrodeposit of soft metallic material on said inner face and providing thereover a cylindrical soft bearing surface and a cylindrical member having a hard surface and associated with the outer link members and pivotally mounted in said bore with interposition of said electrodeposit, said bushing having a cylindrical outer face coaxial with said inner face thereof, a second electrodeposit of soft and compressible metallic material on said cylindrical outer face and constituting thereover a cylindrical soft bearing surface, and a roller rotatively mounted on said cylindrical outer face with interposition of said second electrodeposit the thickness of said first electrodeposit and the thickness of said second electrodeposit being respectively substantially equal to the clearance between the first electrodeposit and the cylindrical member and the clearance between the second electrodeposit and said roller.

9. An unused new transmission chain intended to transmit a given load and comprising a series of outer link members and inner link members and articulation devices connecting the series of outer link members to the series of inner link members, each articulation device comprising in combination a metal bushing having a hard surface and engaged in the inner link members and having a cylindrical inner face defining a bore, a plating of soft metallic bearing material on said inner face and constituting thereover a soft bearing surface, and an inner cylindrical metal member having a hard surface and engaged in the outer link members and pivotally mounted in said bore with interposition of said metallic material, the thickness of the metallic material being substantially equal to the diametral clearance between the inner cylindrical member and the bearing surface, the pitch between said outer link members and said inner link members being less than the intended nominal pitch of the link members to a given extent and said metallic material being compressible during chain operation under said load to an extent identical to said given extent, whereby when the chain operates, said cylindrical member is embedded in said metallic material and the link members have said nominal pitch.

10. An unused new transmission chain as claimed in claim 6, wherein said bearing metal alloy is a lead-base alloy.

11. An unused new transmission chain as claimed in claim 6, wherein said bearing metal alloy is a copper-base alloy.

12. An unused new transmission chain as claimed in claim 6, wherein said bearing metal alloy is a zinc-base alloy.

References Cited in the file of this patent

UNITED STATES PATENTS

| | | |
|---|---|---|
| 1,191,395 | Bunnell | July 18, 1916 |
| 2,061,223 | Cunningham et al. | Nov. 17, 1936 |
| 2,173,985 | Strickland et al. | Sept. 26, 1939 |
| 2,293,029 | Focke | Aug. 18, 1942 |
| 2,431,702 | McCann | Dec. 2, 1947 |
| 2,547,465 | Heintz et al. | Apr. 3, 1951 |
| 2,553,646 | Field | May 22, 1951 |
| 2,586,099 | Schultz | Feb. 19, 1952 |
| 2,648,580 | Lignian | Aug. 11, 1953 |
| 2,816,453 | Frank et al. | Dec. 17, 1957 |